(No Model.)
J. KLOTZ & F. KUSCHEL.
CARRIAGE POLE COUPLING.
No. 407,017. Patented July 16, 1889.
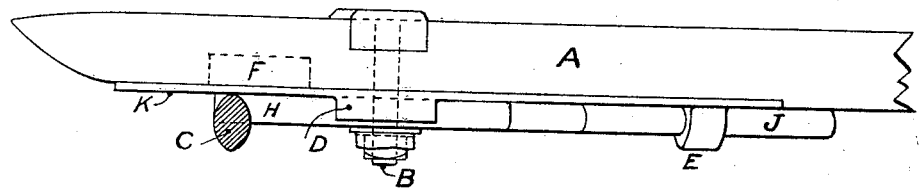
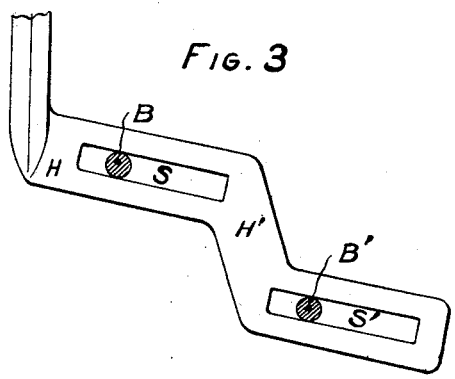
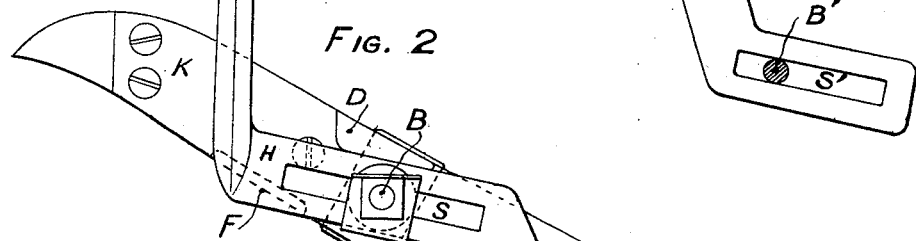
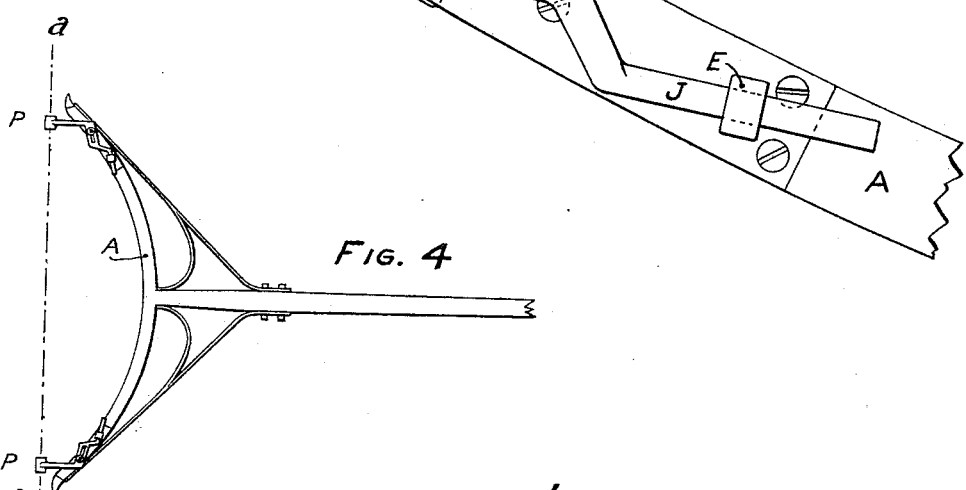
WITNESSES,
John Richards
J. H. Banker
INVENTORS,
Joseph Klotz
Ferdinand Kuschel

UNITED STATES PATENT OFFICE.

JOSEPH KLOTZ AND FERDINAND KUSCHEL, OF PITTSTON, PENNSYLVANIA.

CARRIAGE-POLE COUPLING.

SPECIFICATION forming part of Letters Patent No. 407,017, dated July 16, 1889.

Application filed November 1, 1888. Serial No. 289,745. (No model.)

*To all whom it may concern:*

Be it known that we, JOSEPH KLOTZ and FERDINAND KUSCHEL, citizens of the United States, residing at Pittston, in the county of Luzerne and State of Pennsylvania, have invented a new and useful Adjustable Coupling for Carriage-Poles, of which the following is a specification.

Our invention is of improved fastenings for carriage-poles; and the objects of our improvements are, first, to provide an adjustable coupling whereby a carriage-pole may be attached to various vehicles readily; second, to provide an adjustable coupling adapted to a carriage-pole having a curved cross-bar; third, to receive the strain or draft upon solid lugs or flanges, instead of bolts or nuts. We attain these objects by the construction shown in the accompanying drawings, in which—

Figure 1 is a rear view of the end of the cross-bar with the coupling in place, with the eye or "pipe" P broken off. Fig. 2 shows the under side of the cross-bar and coupling. Fig. 3 shows a coupling designed for heavy vehicles, and Fig. 4 shows the under side of a carriage-pole with our improved couplings in place.

The eye or pipe P is supposed to be held in the thill-boxes by a bolt in the usual manner. It is connected by a shank C with a slotted arm H, which arm is offset, as shown, and terminates in a round bar J. The bar J slides snugly through an eye E, which is attached to the plate K. The bolt B binds the slotted arm H tightly against the plate K. The plate K has a flange F projecting upward on the front side of the cross-bar A and bearing firmly against it. Another flange or lug D projects downward from the plate K behind the arm H. The plate K is attached to the wooden cross-bar A by any usual means.

By slacking off the bolt B the coupling C H J may be slid to the right or left as far as the slot S will allow, and the axis of the eye or pipe P will be always parallel to the axis of the thill-boxes, which is the line *a b*, Figs. 2 and 4. A carriage-pole fitted with these couplings, as shown in Fig. 4, is thus easily adapted to couple to vehicles having thill-boxes at different distances apart. For heavy vehicles the arm H is constructed with two slots S S', Fig. 3, and is clamped by two bolts B and B'.

To adapt our couplings to curved cross-bars like A, we construct them with an offset between the slotted part H and the round extension J. If the slot S and round bar J were in line, the weight of the pole, being supported at the eye P, would twist the slotted arm H, or would break the nut off the bolt B; but the offset between H and J acts as a radial arm and greatly helps to resist the twisting tendency described. The offset H' in Fig. 3 serves the same purpose.

The pull on the shank C is taken largely by the lug D on the plate K, and is transmitted by the plate K to the flange F, and is thus directly delivered to the wooden cross-bar A without imposing any considerable strain on the wood-screws or other fastenings of K to bar A.

What we claim as our invention, and wish to secure by Letters Patent, is—

1. The combination, in an adjustable carriage-pole coupling, of the shank C, having an eye P and a slotted arm H, terminating in an offset guide-bar J, which is parallel to but not in line with the slot in arm H, with the bolt B, eye E, and plate K, substantially as shown and described.

2. In an adjustable device for attaching carriage-poles, the plate K, having a lug D projecting from one side of it, and a flange F projecting from the opposite side, substantially as shown and described, for the purpose set forth.

3. In an adjustable carriage-pole coupling, the offset arm H H' and parallel slots S S', with the bolts B B', substantially as shown and described, for the purpose set forth.

4. An adjustable carriage-pole coupling consisting of a coupling-eye and a shank having a laterally-projecting arm formed with an offset into two parallel guides, which are out of line with each other, substantially as shown and described.

JOSEPH KLOTZ.
FERDINAND KUSCHEL.

Witnesses:
JOHN RICHARDS,
F. H. BANKER.